United States Patent Office 3,240,758
Patented Mar. 15, 1966

3,240,758
PROCESS FOR PRODUCING POLYMERS OF
AROMATIC AMINO ACIDS
Ralph W. Smith and William A. H. Huffman, Durham, and William T. Dye, Jr., Chapel Hill, N.C., assignors to Monsanto Company, a corporation of Delaware
No Drawing. Filed Dec. 18, 1961, Ser. No. 160,336
11 Claims. (Cl. 260—78)

This invention relates to new synthetic linear condensation polymers. More particularly, the invention relates to polyamides prepared from aromatic monomers containing functional groups attached directly to the same aromatic ring or ring system and to their preparation.

Prior to this invention, fiber-forming homopolymers from monomers having both functional groups in the same molecule have been obtained only in the aliphatic series. In the case of aromatic polymers molecular weights and yields were low, and simpler techniques and less expensive aliphatic monomers were known to produce polymers of equal or higher molecular weight. For example, filament and fiber-forming polyamides from purely aromatic amino acids in which both the amino and the acid radicals are attached directly to the same aromatic ring or system of rings have never been shown in the prior art.

Accordingly, it is an object of the present invention to produce new compositions of matter. Another object of the invention is to provide filament and fiber-forming polymers from aromatic monomers where both the amino and the other reactive substituent are attached directly to the same aromatic ring or system of rings. A further object of the invention is to provide a new class of polymers having high stability to degradative conditions such as solvents, high temperatures, hydrolytic agents, high energy radiation and other similar degradative conditions. Still another object is to provide a process of the preparation of polymers from aromatic monomers where both the amino and the other reactive substituent are attached directly to the aromatic nucleus. Other objects and advantages will be apparent from the description hereinafter.

In general, the objects of the invention are accomplished by preparing a polymerization environment which may be referred to as a basic emulsion or suspension containing a proton acceptor to which the monomer is added and a homopolymerization completed shortly thereafter. The polymerization is of the emulsion, also called interfacial, type and is conducted at room temperature. Aromatic monomers from which the aromatic polymers of the invention may be prepared are the amine salts of aromatic acid halides and the amine salts of aromatic sulfonyl halides. From such monomers by the polymerization process of this invention, polyamides and polysulfonamides of high molecular weight and stability may be prepared.

For interfacial or emulsion polymerization a simple blending apparatus is selected and water added. The amount of water added is based on the amount of monomer employed and may conveniently vary from 8 to 12 parts per part of monomer, preferably 10 parts water per part of monomer. The proton acceptor is then added in the amount of an excess of the quantity needed to neutralize the acid-by product of polymerization as formed. From .01 to .05 part, based on monomer parts, of an emulsifying agent, preferably .025 part, are blended therein. From 2 to 4 parts, preferably 3 parts, of a medium for the suspension of the monomer may be added prior to the addition of the monomer itself, if desired. The emulsion is subjected to rapid stirring and the monomer suspended in a suitable medium is added. The stirring is continued at high speed for 10 to 15 minutes and the resulting polymer isolated, preferably by filtration, washed and dried.

The media for suspending the monomer suitably includes tetrahydrofuran, chlorinated hydrocarbons, such as methylene chloride, chloroform and chlorobenzene, benzene, acetone, nitrobenzene, benzonitrile, acetophenone, acetonitrile, toluene and mixtures of these solvents, such as tetrahydrofuran and benzonitrile, terahydrofuran and benzene, tetrahydrofuran and acetophenone, or benzene and acetone and the like. It has been found that a mixture of about 1 part of tetrahydrofuran and 2 parts of benzonitrile per part by weight of monomer is preferred for the preparation of fiberforming polymer. This suspension medium allows easy transfer of monomer to the basic emulsion and at the same time aids in keeping the polymer highly swollen during polymerization.

Suitable emulsifying agents include anionic and nonionic compounds such as sodium lauryl sulfate, nonylphenoxy (ethyleneoxy) ethane, the sodium or potassium salts of any suitable condensed sulfonic acid, and the like.

A proton acceptor, as the term is employed herein, indicates a compound which acts as an acid scavenger to neutralize HCl as formed during the reaction and directs the reaction to completion. The pH range of the reaction mixture must be properly maintained between 6 and 10 during the reaction. Suitable proton acceptors include sodium carbonate, magnesium carbonate, calcium carbonate, tertiary amines such as triethylamine, trimethylamine, tripropylamine and the like.

Suitable monomers which may be polymerized to produce the fiber-forming polymers of the present invention include compounds having the general formula:

(I)
$$X\text{-}[H_3N]^+ \diagdown \\ \qquad\qquad A\text{—}R \\ \qquad\qquad | \\ \qquad\qquad R'$$

wherein A represents an aromatic nucleus which may be naphthylene or substituted naphthylene, biphenylene or substituted biphenylene, X may be selected from chlorine, bromine, sulfate and aryl sulfonate, R is taken from the group consisting of carbonyl halide and sulfonyl halide and R' is hydrogen or any radical or group which is inert in the polymerization reaction such as halogen, aryl, nitro or an alkyl radical containing from 1 to 3 carbon atoms. Thus, by the process of this invention aromatic polyamides and polysulfonamides which have both functional groups attached directly to the aromatic ring system may be produced. Suitable monomers having the general Formula I which may be polymerized according to the present invention are the hydrohalide salts of amino biphenylylcarbonyl halides and ring substituted derivatives thereof such as 4-amino-4'-chlorocarbonylbiphenyl hydrochloride,
3-amino-4'-chlorocarbonylbiphenyl hydrochloride,
3-amino-3'-chlorocarbonylbiphenyl hydrochloride,
3-amino-5'-chlorocarbonylbiphenyl hydrochloride,
4-amino-3'-chlorocarbonylbiphenyl hydrochloride,
4-amino-4'-bromocarbonylbiphenyl hydrochloride,
4-amino-4'-bromocarbonylbiphenyl hydrochloride,
3-amino-4'-bromocarbonylbiphenyl hydrochloride,
3-amino-3'-bromocarbonylbiphenyl hydrochloride,
3-amino-5'-bromocarbonylbiphenyl hydrochloride,
4-amino-3'-bromocarbonylbiphenyl hydrochloride,
4-amino-4'-chlorocarbonylbiphenyl hydrobromide,
3-amino-4'-chlorocarbonylbiphenyl hydrobromide,
3-amino-3'-chlorocarbonylbiphenyl hydrobromide,
3-amino-5'-chlorocarbonylbiphenyl hydrobromide,
4-amino-3'chlorocarbonylbiphenyl hydrobromide,
6-methyl-4-amino-4'-chlorocarbonylbiphenyl hydrochloride, 2'-methyl-4-amino-4'-chlorocarbonylbiphenyl hydrochloride
and the like.

Additional monomers include the hydrohalide salts of amino diphenyl alkane carbonyl halides such as 4-amino-4'-chlorocarbonyl diphenyl methylene hydrochloride, 3-amino-4'-chlorocarbonyl diphenyl methylene hydrochloride and the like.

Further suitable monomers include the hydrohalide salts of amino naphthoyl halides such as 7-amino-2-naphthoyl chloride hydrochloride, 6-amino-2-naphthoyl chloride hydrochloride, 7-amino-2-naphthoyl bromide hydrobromide, 6-amino-2-naphthoyl bromide hydrobromide, 7-amino-2-naphthoyl chloride hydrobromide, 5-amino-2-naphthoyl chloride hydrochloride and the like.

Other suitable monomers include the aryl sulfonate salts of amino biphenyl carbonyl halides, aryl sulfonate salts of amino naphthoyl halides, aryl sulfonate salts of amino diphenylalkane carbonyl halides, aryl sulfonate salts of amino biphenyl sulfonyl halides and the like. As examples of compounds embraced by these formulations there may be mentioned 4-amino-4'-chlorocarbonylbiphenyl m-toluene sulfonate, 6-aminonaphthoyl chloride p-toluene sulfonate, 4-amino-4'-chlorocarbonyldiphenyl methane p-toluene sulfonate, 4-amino-4'-chlorosulfonyl biphenyl p-toluene sulfonate and the like.

These monomers may be prepared in general, by using a thionyl chloride process or any other suitable method known in the art. For example, 4-amino-4'-chlorocarbonylbiphenyl hydrochloride may be prepared by converting 4-amino-4'-carboxybiphenyl to 4-thionylamino-4'-chlorocarbonylbiphenyl by refluxing with thionyl chloride. Excess thionyl chloride may then be distilled off and the product dissolved in a suitable solvent such as tetrahydrofuran, then cooled and subjected to the action of anhydrous hydrogen chloride which results in the 4-amino-4'-chlorocarbonylbiphenyl hydrochloride. Other monomers mentioned herein may be prepared by similar processes.

The polymers of this invention may be represented by the general formula (II) 

wherein A represents an aromatic nucleus which may be naphthylene or substituted naphthylene, biphenylene or substituted biphenylene or diphenylalkane wherein the alkane radical contains from 1 to 3 carbon atoms, R represents a compound taken from the group consisting of carbonyl and sulfonyl and R' is hydrogen or any radical or group which is inert in the polymerization reaction such as halogen, aryl, nitro or an alkyl radical containing from 1 to 3 carbon atoms. Typical examples of the polymers which may be produced according to this invention include

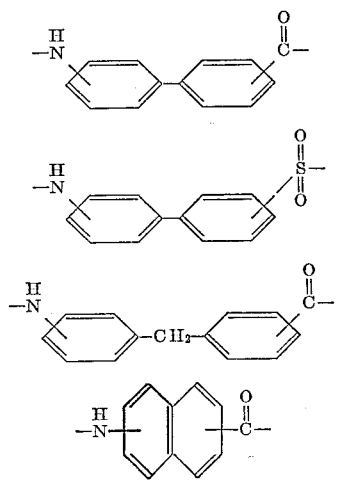

Further polymers contemplated by this invention include polymers wherein the ring or rings are substituted by suitable radicals or groups which are inert in the polymerization reaction such as those enumerated above. The distinguishing characteristic in every example is the direct bonding of both the amino and the carbonyl or sulfonyl group directly to the aromatic nucleus which produces the high molecular weight and high melting polymers of this invention.

The polymers of this invention are suitable for the production of fibers, filaments, films and other shaped articles. These polymers have a softening point range of from 500 to 650° C. or higher as determined by differential thermal analysis which renders them peculiarly adaptable for high temperature applications.

It is also possible by the process of this invention to prepare copolymers by reacting the polymer forming monomers of this invention with suitable amounts, preferably 10 to 15 percent, of aromatic or aliphatic diamines (or their hydrochlorides) and aromatic or aliphatic diacyl halides. Thus, the elements of polyhexamethylene terephthalamide, polyhexamethylene adipamide, polyhexamethylene sebacamide, and poly-m-phenylene isophthalamide, may be incorporated into copolymers with the elements of the polymers of this invention. Also, these named polymers or similar ones may be blended with the polymers of this invention for various end uses.

The polymers of this invention are useful in a wide variety of shapes and forms. Fibers and filaments produced from such polymers are useful in applications requiring high resistance to heat such as filters, electrical insulations, hoses, brake linings, parachutes, tire cords and other compositions requiring these exceptional properties. These polymers are unusually highly resistant to solvents which attack most polyamides. As films such polymers may be employed in a large variety of lining and coating end uses requiring prolonged resistance to high temperatures, acids, hydrolytic agents and other degradative conditions.

The invention is further illustrated by the following example in which all parts and percents are by weight unless otherwise indicated.

EXAMPLE

To a 500-ml. container, 75 ml. of water, 6.4 gm. of sodium carbonate, 2 gm. of sodium lauryl sulfate, and 25 ml. of tetrahydrofuran were added. While the emulsion was rapidly stirred a suspension of 7.04 gm. of 4-amino-4'-chlorocarbonylbiphenyl hydrochloride dissolved in 17 ml. of benzonitrile and 9 ml. of tetrahydrofuran was added. While stirring was continued 250 ml. of portions of water were added. The stirring was continued for 10 minutes. The excess water was added to reduce the swelling capacity of the reaction mixture. After 10 minutes the reaction was complete and the polymer, poly-4,4'-phenylbenzamide, was isolated, washed and dried. A yield of 84 percent was obtained. In a capillary melting point apparatus only slight discoloration of the polymer was observed at 450° C., with only slight browning occurring on heating for 14 minutes at 500° C. No melting point was observed below 510° C. Differential thermal analysis showed no transition of any magnitude below 500° C. Thermo gravimetric analysis showed no appreciable weight loss below 650° C. The polymer was found to be slightly soluble in warm concentrated sulfuric acid, insoluble in dimethylacetamide, dimethylsulfoxide and in N-methyl pyrrolidone containing lithium chloride.

Following the procedures of the example other polymers which may be prepared from the monomers of this invention are polymerized with similar results to polymers having the properties of high temperature stability and resistance to degradative conditions.

As many variations of this invention may be made without departing from the spirit and scope thereof, it is

We claim:
1. A process for the production of fiber-forming polymers composed of the repeating unit

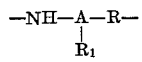

wherein A represents an aromatic nucleus selected from the group consisting of naphthalene, biphenylene and diphenyl methylene, R is taken from the group consisting of carbonyl and sulfonyl, and $R_1$ is selected from the group consisting of hydrogen, halogen, aryl, nitro and alkyl radicals containing from 1 to 3 carbon atoms, comprising mixing water, a proton acceptor and an emulsifying agent to form a basic emulsion, adding to said basic emulsion an aromatic monomer of the general formula (II) 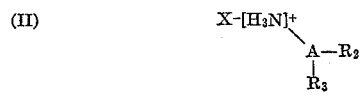

wherein A is an aromatic nucleus selected from the group consisting of naphthalene, biphenylene and diphenyl methylene, X is selected from the group consisting of chlorine, bromine, sulfate and arylsulfonate, $R_2$ is taken from the group consisting of carbonyl halide and sulfonyl halide and $R_3$ is taken from the group consisting of hydrogen, halogen, aryl, nitro and alkyl radicals containing from 1 to 3 carbon atoms, dissolved in a solvent therefor, and stirring until polymerization is complete.

2. The process of claim 1 wherein R is carbonyl.
3. The process of claim 1 wherein R is sulfonyl.
4. The process of claim 1 wherein the pH of the basic emulsion is from 6 to about 10.
5. The process of claim 1 wherein the proton acceptor is sodium carbonate.
6. The process of claim 1 wherein the proton acceptor is calcium carbonate.
7. The process of claim 1 wherein the proton acceptor is magnesium carbonate.
8. The process of claim 1 wherein the proton acceptor is triethyl amine.
9. The process of claim 1 wherein the emulsifying agent is sodium lauryl sulfate.
10. The process of claim 1 wherein the emulsifying agent is nonylphenoxy (ethyleneoxy)ethane.
11. A process for the production of a fiber-forming homopolymer of 4-amino-4'-carboxy-biphenyl comprising mixing from 8 to 12 parts water, based on monomer parts, excess sodium carbonate, and .01 to .05 part of sodium lauryl sulfate, based on monomer parts, to form a basic emulsion, adding to said basic emulsion one part of 4-amino-4'-chlorocarbonyl biphenyl hydrochloride dissolved in 2 to 4 parts of a solvent comprising benzonitrile and tetrahydrofuran in a 2 to 1 ratio respectively, and stirring until polymerization is complete.

References Cited by the Examiner

UNITED STATES PATENTS

| | | | |
|---|---|---|---|
| 2,667,468 | 1/1954 | Jones et al. | 260—79.3 |
| 2,688,011 | 8/1954 | Wheatley et al. | 260—78 |
| 2,868,770 | 1/1959 | Temin | 260—78 |
| 2,913,433 | 11/1959 | Wittbecker | 260—78 |

OTHER REFERENCES

Colonge et al.: Societe Chimique de France, January 1955, pp. 312–419.

WILLIAM H. SHORT, *Primary Examiner.*

LOUISE P. QUAST, JOSEPH L. SCHOFER, *Examiners.*